United States Patent
Kusumoto et al.

(10) Patent No.: US 11,637,734 B2
(45) Date of Patent: Apr. 25, 2023

(54) RADIO-FREQUENCY CIRCUIT, COMMUNICATION DEVICE, AND RADIO-FREQUENCY CIRCUIT DESIGNING METHOD

(71) Applicant: Murata Manufacturing Co., Ltd., Nagaokakyo (JP)

(72) Inventors: Yusuke Kusumoto, Nagaokakyo (JP); Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 136 days.

(21) Appl. No.: 17/002,429

(22) Filed: Aug. 25, 2020

(65) Prior Publication Data
US 2021/0067399 A1 Mar. 4, 2021

(30) Foreign Application Priority Data

Aug. 28, 2019 (JP) .............................. JP2019-155256

(51) Int. Cl.
*H04L 12/00* (2006.01)
*H04L 27/34* (2006.01)
*H04L 27/36* (2006.01)
*H04B 1/00* (2006.01)
*H04L 5/14* (2006.01)

(52) U.S. Cl.
CPC ....... *H04L 27/3405* (2013.01); *H04B 1/0057* (2013.01); *H04B 1/0067* (2013.01); *H04L 5/1461* (2013.01); *H04L 27/362* (2013.01)

(58) Field of Classification Search
None
See application file for complete search history.

(56) References Cited

U.S. PATENT DOCUMENTS

| | | | |
|---|---|---|---|
| 2012/0076188 A1* | 3/2012 | Cohen | H04W 52/16 370/260 |
| 2016/0164487 A1* | 6/2016 | Shin | H03H 9/605 333/189 |
| 2016/0323080 A1* | 11/2016 | Khlat | H04B 1/38 |
| 2017/0264250 A1* | 9/2017 | Park | H04B 1/04 |
| 2019/0089565 A1* | 3/2019 | Nakada | H04L 27/2615 |

FOREIGN PATENT DOCUMENTS

JP 2018-019246 A 2/2018

OTHER PUBLICATIONS

3GPP TS 36.104, V16.2.0; 3rd Generation Partnership Project; Technical Specification Group Radio Access Network Evolved Universal Terrestrial Radio Access (E-UTRA); Base Station (BS) radio transmission and reception (Release 16), Jun. 2019, pp. 1-265, 3GPP Organizational Partners, Valbonne, FRANCE.
Intel Corporation, Phase discontinuity issue in intra-band EN-DC with a single PA architecture, 3GPP TSG-RAN WG4 89, Nov. 12-16, 2018, pp. 1-4, R4-1814558, Intel Corporation, Spokane, WA, United States of America.

* cited by examiner

*Primary Examiner* — Noel R Beharry
*Assistant Examiner* — Lionel Preval
(74) *Attorney, Agent, or Firm* — Pearne & Gordon LLP

(57) ABSTRACT

A radio-frequency circuit that conveys a radio-frequency signal that is of a predetermined frequency band and modulated using 256-Quadrature Amplitude Modulation (QAM). The magnitude slope, which is the ratio of (i) the change in a magnitude ratio between an input signal and an output signal to (ii) the change in the frequency of the input signal, is at least −0.1 dB/MHz and at most 0.1 dB/MHz in the predetermined frequency band.

9 Claims, 13 Drawing Sheets

FIG. 10

| First frequency band | | | Second frequency band | | | | frequency gap (X) | Center frequency (Y) | X/Y | Band width (Z) | X/Z |
|---|---|---|---|---|---|---|---|---|---|---|---|
| Band number | Duplex mode | UL/DL | Operating band | Band number | Duplex mode | UL/DL | Operating band | | | | |
| n71 | FDD | UL | 663 - 698 MHz | n71 | FDD | DL | 617 - 652 MHz | 11 MHz | 635 MHz | 1.7% | 35 MHz | 31% |
| n28 | FDD | UL | 703 - 748 MHz | n28 | FDD | DL | 758 - 803 MHz | 10 MHz | 726 MHz | 1.4% | 45 MHz | 29% |
| n20 | FDD | UL | 832 - 862 MHz | n20 | FDD | DL | 791 - 821 MHz | 11 MHz | 806 MHz | 1.4% | 30 MHz | 37% |
| n26 | FDD | UL | 814 - 849 MHz | n26 | FDD | DL | 859 - 894 MHz | 10 MHz | 832 MHz | 1.2% | 35 MHz | 29% |
| n8 | FDD | UL | 880 - 915 MHz | n8 | FDD | DL | 925 - 960 MHz | 10 MHz | 898 MHz | 1.1% | 35 MHz | 29% |
| n3 | FDD | UL | 1710 - 1785 MHz | n3 | FDD | DL | 1805 - 1880 MHz | 20 MHz | 1748 MHz | 1.1% | 75 MHz | 27% |
| n2 | FDD | UL | 1850 - 1910 MHz | n2 | FDD | DL | 1930 - 1990 MHz | 20 MHz | 1880 MHz | 1.1% | 60 MHz | 33% |
| n25 | FDD | UL | 1850 - 1915 MHz | n25 | FDD | DL | 1930 - 1995 MHz | 15 MHz | 1883 MHz | 0.8% | 65 MHz | 23% |
| n39 | TDD | - | 1880 - 1920 MHz | n25 | FDD | DL | 1930 - 1995 MHz | 10 MHz | 1900 MHz | 0.5% | 40 MHz | 25% |
| n77 | TDD | - | 3300 - 4200 MHz | n79 | TDD | - | 4400 - 5000 MHz | 200 MHz | 3750 MHz | 5.3% | 900M Hz | 22% |
| n79 | TDD | - | 4400 - 5000 MHz | WLAN | TDD | - | 5150 - 5850 MHz | 150 MHz | 4700 MHz | 3.2% | 600 MHz | 25% |
| WLAN | TDD | - | 5150 - 5850 MHz | WLAN | TDD | - | 5925 - 7125 MHz | 75 MHz | 5500 MHz | 1.3% | 700 MHz | 11% |
| WLAN | TDD | - | 5150 - 5350 MHz | WLAN | TDD | - | 5470 - 5850 MHz | 120 MHz | 5660 MHz | 2.0% | 380 MHz | 32% |

RADIO-FREQUENCY CIRCUIT, COMMUNICATION DEVICE, AND RADIO-FREQUENCY CIRCUIT DESIGNING METHOD

CROSS REFERENCE TO RELATED APPLICATION

The present application is based on and claims priority of Japanese Patent Application No. 2019-155256 filed on Aug. 28, 2019. The entire disclosure of the above-identified application, including the specification, drawings and claims is incorporated herein by reference in its entirety.

TECHNICAL FIELD

The present disclosure relates to a radio-frequency circuit, a communication device including the radio-frequency circuit, and a radio-frequency circuit designing method.

BACKGROUND

In wireless communication, in order to improve information density and increase data rate, 256-quadrature amplitude modulation (QAM) and 1024-QAM, for example, are starting to be adopted as higher-order modulation methods. In such modulation methods, higher performance is required from communication devices in order to ensure signal quality. For example, in the 3rd Generation Partnership Project (3GPP) standard, the required performance for each modulation method is defined using error vector magnitude (EVM), as shown below.

TABLE 1

| Modulation scheme for PDSCH or sPDSCH | Required EVM [%] |
|---|---|
| QPSK | 17.5% |
| 16-QAM | 12.5% |
| 64-QAM | 8% |
| 256-QAM | 3.5% |
| 1024-QAM | 2.5% |

Japanese Unexamined Patent Application Publication No. 2018-19246 ("PTL 1") discloses a peak suppression circuit for satisfying a higher required EVM.

BRIEF SUMMARY

However, for radio-frequency circuits as a whole, it is difficult to satisfy a higher required EVM with only the improvements to the peak suppression circuit in PTL 1 described above.

In view of this, the present disclosure provides radio-frequency circuits, and so on, capable of satisfying higher required performance for higher-order modulation methods.

A radio-frequency circuit according to one aspect of the present disclosure is a radio-frequency circuit that conveys a radio-frequency signal that is of a predetermined frequency band and is modulated using 256-Quadrature Amplitude Modulation (QAM), wherein a magnitude slope is at least −0.1 dB/MHz and at most 0.1 dB/MHz in the predetermined frequency band, the magnitude slope being a ratio of (i) a change in a magnitude ratio between an input signal and an output signal to (ii) a change in a frequency of the input signal.

A communication device according to an aspect of the present disclosure includes: the above-described radio-frequency circuit; and a signal processing circuit that processes the radio-frequency signal, wherein the radio-frequency circuit conveys the radio-frequency signal between an antenna element for at least one of transmission and reception of the radio-frequency signal and the signal processing circuit.

A radio-frequency circuit designing method according to an aspect of the present disclosure is a method of designing a radio-frequency circuit that conveys a radio-frequency signal that is of a predetermined frequency band and is modulated using a predetermined modulation method, the method including: obtaining a condition of a magnitude slope for satisfying a required performance for the predetermined modulation method, the magnitude slope being a ratio of (i) a change in a magnitude ratio between an input signal and an output signal to (ii) a change in a frequency of the input signal; and designing the radio-frequency circuit to satisfy the condition of the magnitude slope obtained.

It should be noted that these generic or specific aspects may be implemented as a system, an apparatus, an integrated circuit, a computer program, or a computer-readable recording medium such as a CD-ROM, or may be implemented as any combination of a system, an apparatus, an integrated circuit, a computer program, and a recording medium.

According to the present disclosure, higher required performance for higher-order modulation methods can be satisfied.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 10 is a list of combinations of first frequency bands and second frequency bands in Implemental Example 1.

DETAILED DESCRIPTION OF EMBODIMENTS

Hereinafter, exemplary embodiments will be described in detail with reference to the drawings.

It should be noted that each of the subsequently described exemplary embodiments shows a generic or a specific example. The numerical values, shapes, materials, elements, the arrangement and connection of the elements, steps and the order of the steps, and others indicated in the following exemplary embodiments are mere examples, and therefore are not intended to limit the present disclosure.

Furthermore, the respective figures are not necessarily accurate illustrations. In the figures, elements which are substantially the same are given the same reference signs, and overlapping description is omitted or simplified.

Embodiments

1.1 Radio-Frequency Circuit Designing Method

The inventors discovered that the EVM of a radio-frequency signal is dependent on the ratio (hereafter referred to as magnitude slope) of (i) the change in the magnitude ratio between the input signal and the output signal to (ii) the change in the frequency of the input signal of a radio-frequency circuit, and found a method of designing a radio-frequency circuit using such dependency. Hereinafter, a radio-frequency circuit designing method according to an embodiment will be described in detail with reference to FIG.

Figure 1:
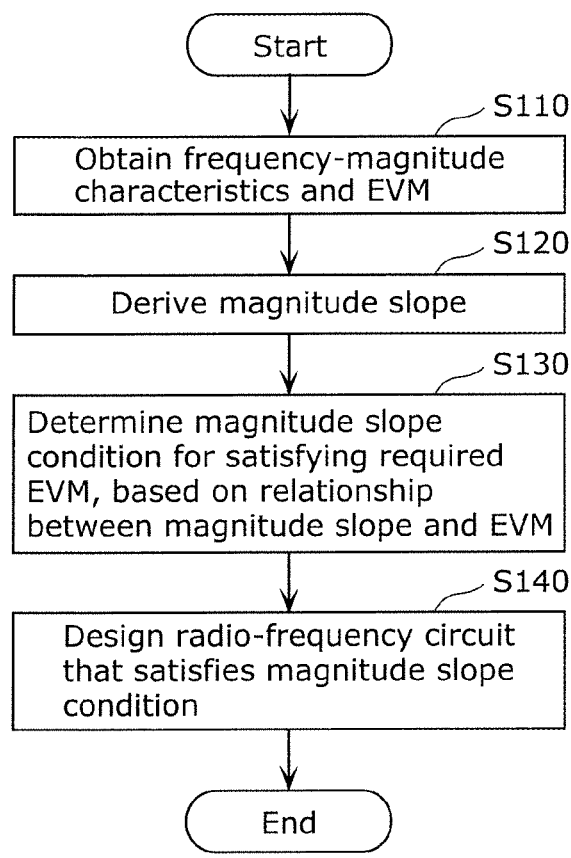
FIG. 1 is a flowchart of a radio-frequency circuit designing method according to an embodiment.

FIG. 1 is a flowchart of a radio-frequency circuit designing method according to the embodiment. The respective processes in FIG. 1 may be performed by a computer that includes a processor and a memory, for example.

First, the frequency-magnitude characteristics of a predetermined radio-frequency circuit and the EVM of a radio-frequency signal output from the predetermined radio-frequency circuit are obtained in step S110.

The predetermined radio-frequency circuit corresponds to the radio-frequency circuit to be designed, and conveys radio-frequency signals of a predetermined frequency band, which have been modulated using a predetermined modulation method. For the predetermined radio-frequency circuit, a virtual and/or physical circuit can be used. Specifically, in the obtaining of the frequency-magnitude characteristics and the EVM, a calculated value based on a virtual circuit that has been made into a model or an actual measurement value based on a physical circuit may be used.

The predetermined modulation method is the modulation method of the radio-frequency signals conveyed by the radio-frequency circuit to be designed. For the predetermined modulation method, for example, 256-QAM, 1024-QAM, and so on, can be used, but the modulation method is not limited to such modulations.

The predetermined frequency band is the frequency band of the radio-frequency signals conveyed by the radio-frequency circuit to be designed. For the predetermined frequency band, for example, a communication band defined in the 3GPP standard or a channel within that communication band can be used, but the frequency band is not limited to such.

The EVM is a measure used to quantify the performance of a digital radio transmitter or receiver. Specifically, the EVM indicates how far the constellation point of a signal transmitted by the transmitter or a signal received by the receiver is from the ideal signal constellation point. For the EVM measuring method, a typical method can be used, and, for example, a method defined in the 3GPP standard can be used. However, the measuring method is not limited to such a method.

Next, in step 120, the magnitude slope is derived using the frequency-magnitude characteristics obtained in step S110. A specific example of the deriving of the magnitude slope will be described with reference to FIG. 2.

Figure 2:
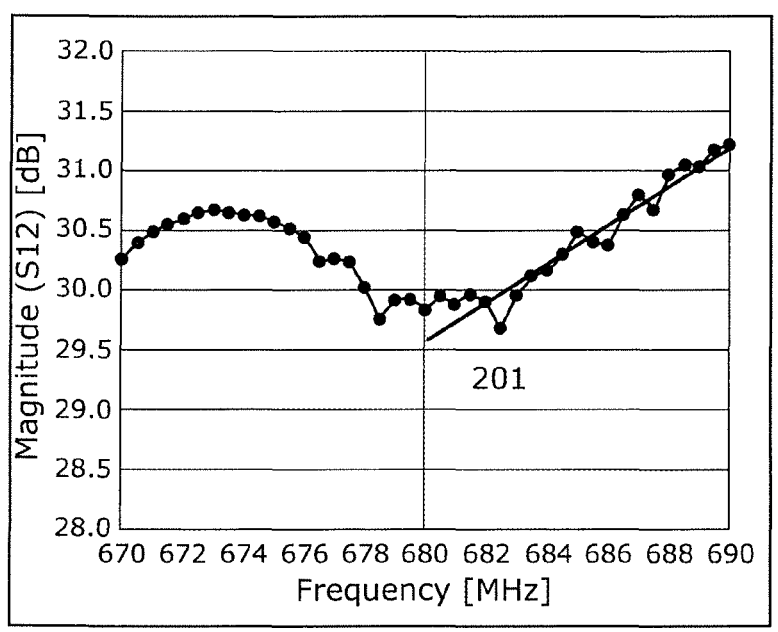
FIG. 2 is a graph illustrating an example of frequency-magnitude characteristics.

FIG. 2 is a graph illustrating an example of frequency-magnitude characteristics of a radio-frequency circuit obtained in step S110. In FIG. 2, the vertical axis denotes the input and output signal magnitude ratio, that is, the ratio of the magnitude of the output signal to the magnitude of the input signal (the gain), and the horizontal axis denotes the frequency of an input signal of the radio-frequency circuit. Here, for the input signal, a radio-frequency signal modulated using 256-QAM is used.

For example, in FIG. 2, in order to derive the magnitude slope in a frequency band from 680 MHz to 690 MHz, approximation straight line 201 indicating the correlation between the frequency of the input signal and the input and output signal magnitude ratio is derived. Then, the magnitude slope is derived using the derived approximation straight line 201. Specifically, the slope of approximation straight line 201 is derived as the magnitude slope.

It should be noted that approximation straight line 201 can be derived by using the least-squares method, and so on, in a linear regression model, but is not limited to this method/model. Furthermore, approximation straight line 201 need not be used for deriving the magnitude slope. For example, the average value of the slopes of microbands included in the frequency band may be derived as the magnitude slope.

Next, in step 130, a magnitude slope condition for satisfying a required EVM for a predetermined modulation method is determined based on the relationship between the magnitude slope derived in step S120 and the EVM obtained in step S110. A specific example of the determining will be described with reference to FIG. 3A to FIG. 3C.

Figure 3A:
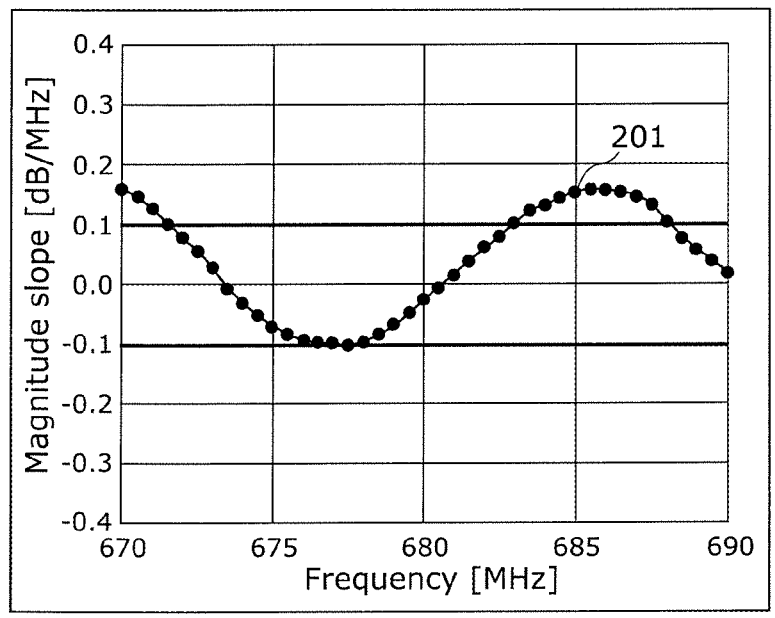
FIG. 3A is a graph illustrating an example of frequency characteristics of a magnitude slope.
Figure 3B:
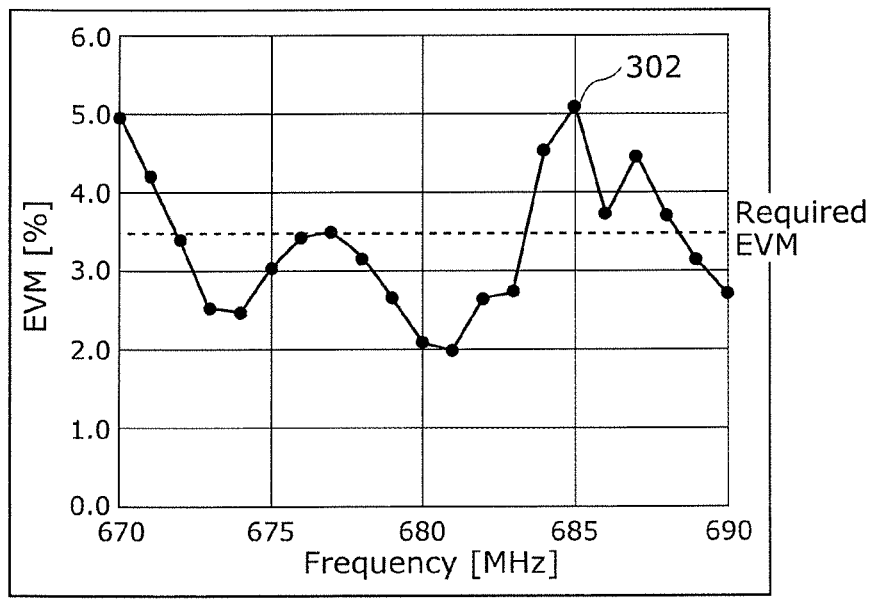
FIG. 3B is a graph illustrating an example of frequency characteristics of EVM.
Figure 3C:
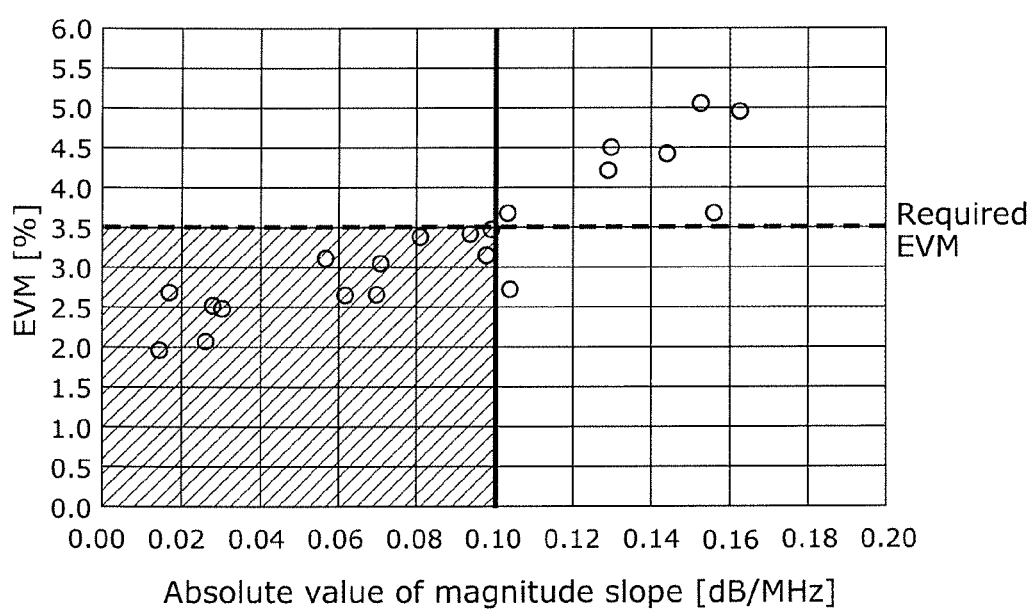
FIG. 3C is a graph illustrating the relationship between the magnitude slope and the EVM.

FIG. 3A is a graph illustrating an example of frequency characteristics of a magnitude slope. FIG. 3B is a graph illustrating an example of frequency characteristics of an EVM. FIG. 3C is a graph illustrating the relationship between the magnitude slope and the EVM. In FIG. 3A and FIG. 3B, the horizontal axis denotes the frequency of an input signal of a radio-frequency circuit, and the vertical axis denotes the magnitude slope (in FIG. 3A) and the EVM (in FIG. 3B). Furthermore, in FIG. 3C, the horizontal axis denotes the absolute value of the magnitude slope, and the vertical axis denotes the EVM. Here, the input signal is a radio-frequency signal modulated using 256-QAM, and the required EVM is 3.5 percent.

In FIG. 3A, each data point denotes the magnitude slope of a frequency band having a bandwidth of 10 MHz, and is associated with a center frequency of the frequency band. For example, data point 301 at 685 MHz denotes the magnitude slope of a frequency band from 680 MHz to 690 MHz.

In FIG. 3B, each data point denotes the EVM of a frequency band having a bandwidth of 10 MHz, and is associated with a center frequency of the frequency band. For example, data point 302 at 685 MHz denotes the EVM of a frequency band from 680 MHz to 690 MHz.

In FIG. 3C, each data point denotes the magnitude slope and the EVM of corresponding frequency bands in FIG. 3A and FIG. 3B.

Looking at FIG. 3C, it can be seen that the EVM is dependent on the magnitude slope. Specifically, when the absolute value of the magnitude slope increases, the EVM increases. For example, when the absolute value of the magnitude slope is at most 0.1 dB/MHz, the EVM is at most 3.5 percent. Therefore, the magnitude slope condition for satisfying a required EVM of 3.5 percent for 256-QAM, can be determined as a range of at least −0.1 dB/MHz to at most 0.1 dB/MHz.

Lastly, in step 140, the radio-frequency circuit is designed so as to satisfy the magnitude slope condition determined in step S130. When the radio-frequency circuit does not satisfy the magnitude slope condition, a radio-frequency circuit that satisfies the magnitude slope condition can be designed by reducing the absolute value of the magnitude slope by adopting a filter having a higher Q value, for example. Furthermore, for example, the absolute value of the magnitude slope may be reduced by reducing the mismatch of impedance between components included in the radio-frequency circuit. It should be noted that the method for reducing the absolute value of the magnitude slope is not limited to those mentioned above.

It should be noted that although, in the designing method in FIG. 1, the magnitude slope condition for the predetermined modulation method and the required EVM is determined based on the frequency-magnitude characteristics and the EVM that were obtained, this determining need not be performed each time designing is performed. For example, when the magnitude slope condition is already determined, there is no need to determine the magnitude slope condition anew, and the already-determined magnitude slope condition may be used.

Furthermore, for the predetermined radio-frequency circuit, a plurality of radio-frequency circuits may be used. In this case, a magnitude slope and an EVM can be obtained from each of the plurality of radio-frequency circuits, and a more accurate magnitude slope condition can be determined.

1.2 Configuration of Radio-Frequency Circuit 1

Figure 4:
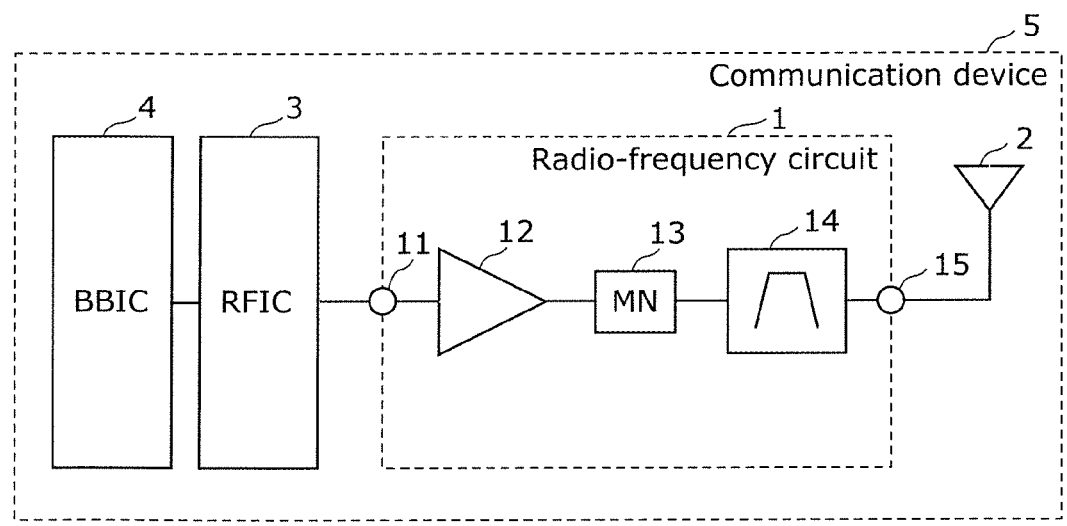
FIG. 4 is an example of a circuit configuration diagram of a radio-frequency circuit and a communication device according to the embodiment.

The configuration of radio-frequency circuit 1 designed in the above-described manner will be described with reference to FIG. 4. FIG. 4 is an example of a circuit configuration diagram of radio-frequency circuit 1 and communication device 5 according to one embodiment.

As illustrated in FIG. 4, communication device 5 includes radio-frequency circuit 1, antenna element 2, RF signal processing circuit (RFIC) 3, and baseband signal processing circuit (BBIC) 4.

Radio-frequency circuit 1 conveys, between antenna element 2 and RFIC 3, radio-frequency signals of a predetermined frequency band which have been modulated using a predetermined modulation method. In FIG. 4, radio-frequency circuit 1 is a transmission circuit that transmits radio-frequency signals of a predetermined frequency band which have been modulated using 256-QAM, for example.

Antenna element 2 is connected to output terminal 15 of radio-frequency circuit 1 and transmits radio-frequency signals conveyed by radio-frequency circuit 1.

RFIC 3 is an example of a signal processing circuit that processes radio-frequency signals, and processes radio-frequency signals to be transmitted by antenna element 2. Specifically, RFIC 3 performs, by upconversion, and the like, signal processing on a transmission signal input from BBIC 4, and outputs the radio-frequency transmission signal generated by the signal processing to radio-frequency circuit 1.

BBIC 4 is a circuit that performs signal processing using an intermediate frequency band having a lower frequency than a radio-frequency signal propagating in radio-frequency circuit 1. BBIC 4 processes, for example, an image signal for image display and/or a sound signal for communication via a speaker.

Here, the internal configuration of radio-frequency circuit 1 will be described. As illustrated in FIG. 4, radio-frequency circuit 1 includes input terminal 11, power amplifying circuit 12, matching circuit 13, filter circuit 14, and output terminal 15.

Power amplifier 12 is connected between input terminal 11 and matching circuit 13. Power amplifying circuit 12 amplifies radio-frequency signals input from RFIC 3 via input terminal 11.

Matching circuit 13 is connected between power amplifying circuit 12 and filter circuit 14. Matching circuit 13 performs impedance matching between power amplifying circuit 12 and filter circuit 14. Specifically, matching circuit 13 is a circuit for matching the output impedance of power amplifying circuit 12 and the input impedance of filter circuit 14. Matching circuit 13 includes a passive element such as an inductor and/or a capacitor.

Filter circuit 14 is connected between matching filter 13 and output terminal 15. Filter circuit 14 passes, with low loss, radio-frequency signals amplified by power amplifying circuit 12. Filter circuit 14 may be any one of a surface acoustic wave filter, a bulk acoustic wave filter, an LC resonant filter, and a dielectric filter, but is not limited to these filters.

It should be noted that the circuit configuration of radio-frequency circuit 1 and communication device 5 in FIG. 4 is one example, and is not limited to such configuration. For example, radio-frequency circuit 1 need not include matching circuit 13. Furthermore, communication device 5 need not include antenna element 2 and BBIC 4. In addition, radio-frequency circuit 1 may include a reception circuit that conveys radio-frequency signals received by antenna element 2.

1.3 Characteristics of Radio-Frequency Circuit 1

Figure 5:
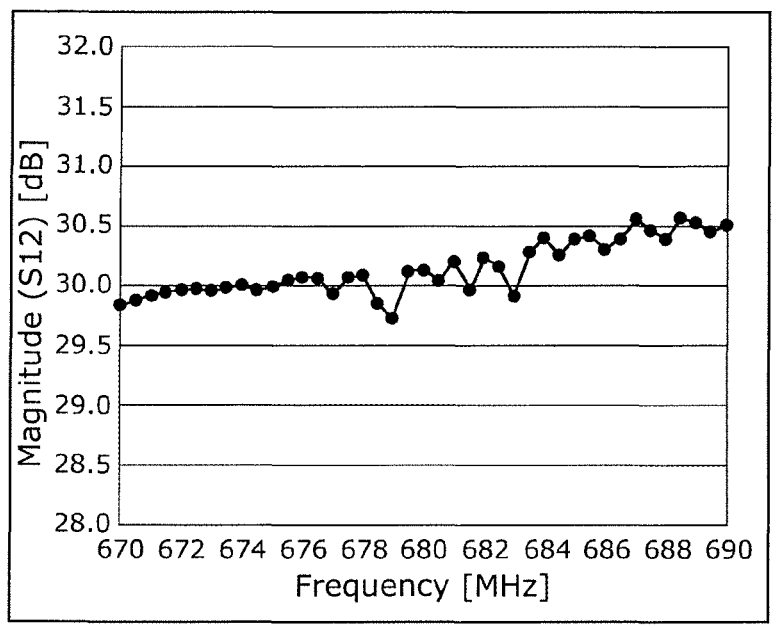
FIG. 5 is a graph illustrating frequency-magnitude characteristics of the radio-frequency circuit according to the embodiment.
Figure 6:
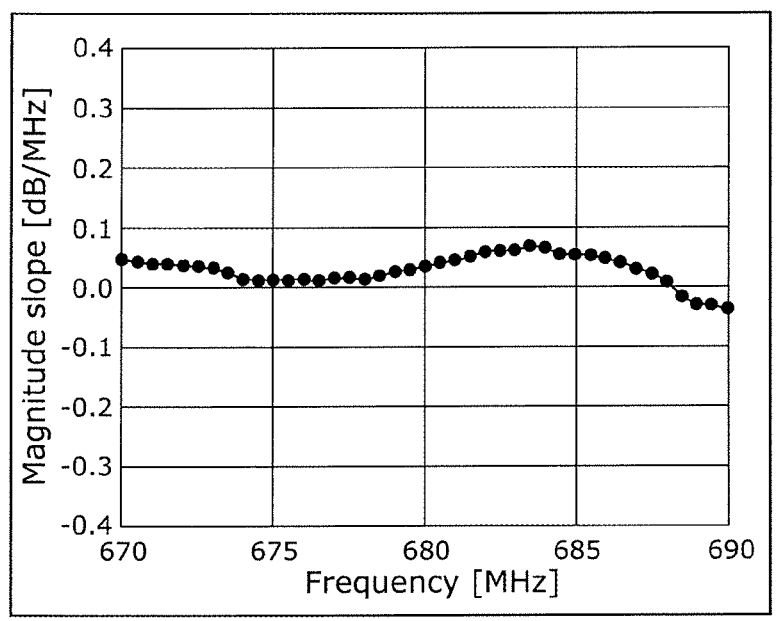
FIG. 6 is a graph illustrating frequency characteristics of the magnitude slope of the radio-frequency circuit according to the embodiment.
Figure 7:
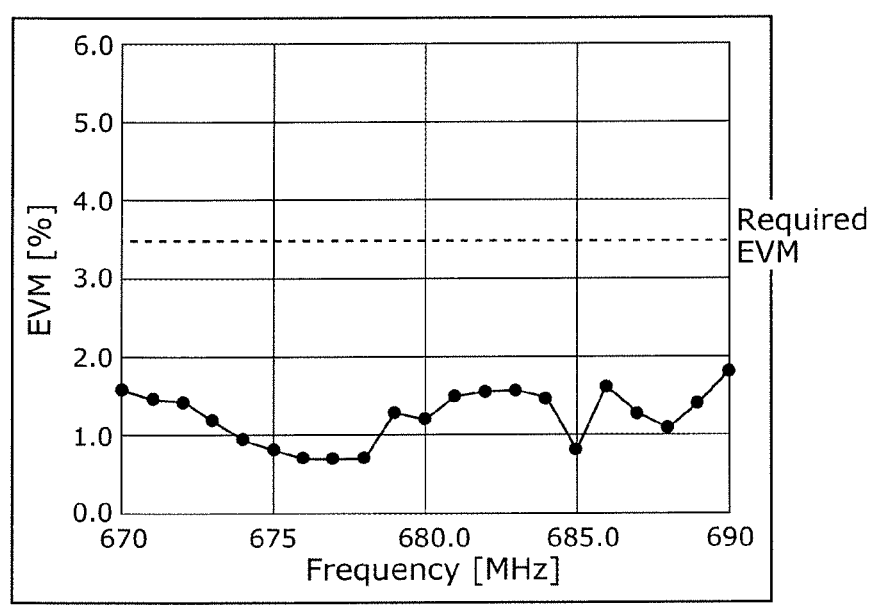
FIG. 7 is a graph illustrating frequency characteristics of the EVM of the radio-frequency circuit according to the embodiment.
Figure 8:
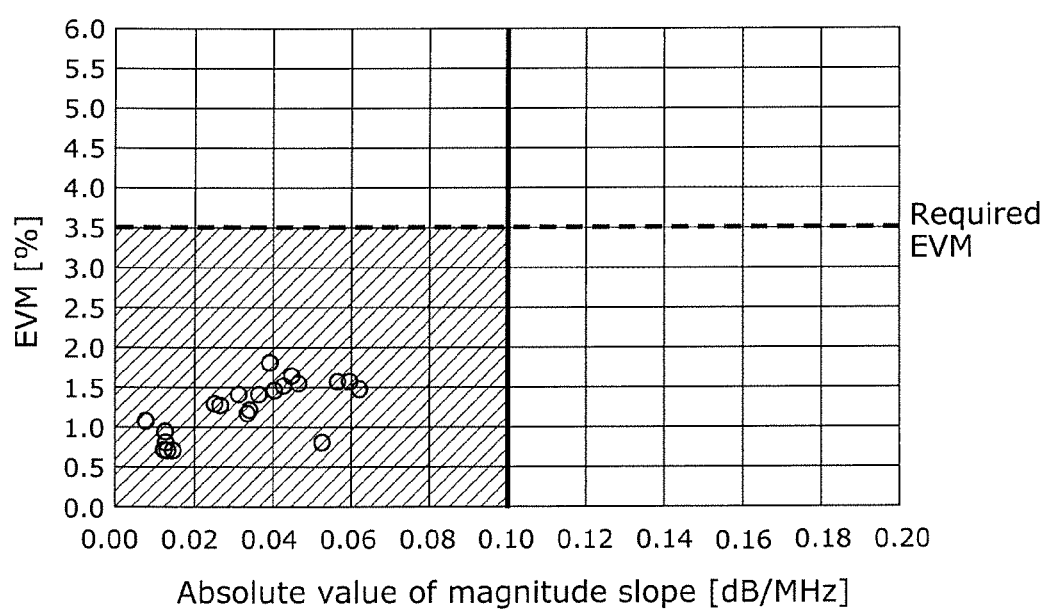
FIG. 8 is a graph illustrating the relationship between the magnitude slope and the EVM of the radio-frequency circuit according to the embodiment.

The characteristics of radio-frequency circuit 1 configured in the above-described manner will be described with reference to FIG. 5 to FIG. 8. FIG. 5 is a graph illustrating frequency-magnitude characteristics of radio-frequency circuit 1 according to the embodiment in FIG. 4. FIG. 6 is a graph illustrating frequency characteristics of the magnitude slope of radio-frequency circuit 1 according to the embodiment in FIG. 4. FIG. 7 is a graph illustrating frequency characteristics of the EVM of radio-frequency circuit 1 according to the embodiment in FIG. 4. FIG. 8 is a graph illustrating the relationship between the magnitude slope and the EVM of radio-frequency circuit 1 according to the embodiment in FIG. 4.

The magnitude slope in FIG. 6 is derived from the frequency-magnitude characteristics in FIG. 5. Here, in the same manner as in FIG. 2 and FIG. 3A, the magnitude slope is derived for a plurality of frequency bands each having a bandwidth of 10 MHz. As illustrated in FIG. 6 and FIG. 8, each of the magnitude slopes of the frequency bands of radio-frequency circuit 1 is included within a range of at least −0.1 dB/MHz to 0.1 dB/MHz. Specifically, the magnitude slope of radio-frequency circuit 1 satisfies the magnitude slope condition for satisfying the required EVM (e.g., 3.5%) for 256-QAM.

As a result, as illustrated in FIG. 7 and FIG. 8, the EVMs of the radio-frequency signals conveyed by radio-frequency circuit 1 satisfies (i.e., the EVMs are below) the required EVM (e.g., 3.5%) in each of the frequency bands having a bandwidth of 10 MHz included in a band from at least 660 MHz to at most 700 MHz.

As described above, radio-frequency circuit 1 according to this embodiment in FIG. 4 is a radio-frequency circuit that conveys a radio-frequency signal that is of a predetermined frequency band and is modulated using 256-QAM. Here, the magnitude slope, which is the ratio of (i) the change in a magnitude ratio between an input signal and an output signal to (ii) the change in the frequency of the input signal, is at least −0.1 dB/MHz and at most 0.1 dB/MHz in the predetermined frequency band.

Accordingly, by setting the magnitude slope to at least −0.1 dB/MHz and at most 0.1 dB/MHz, the EVM of the radio-frequency signals conveyed by radio-frequency circuit 1 can be set to at most the required EVM of 3.5 percent. Therefore, radio-frequency circuit 1 is capable of satisfying a higher required performance for 256-QAM.

Furthermore, communication device 5 according to this embodiment in FIG. 5 includes: above-described radio-frequency circuit 1; and RFIC 3 which processes the radio-frequency signal. Radio-frequency circuit 1 conveys the radio-frequency signal between antenna element 2 for at least one of transmission and reception of the radio-frequency signal and RFIC 3.

Accordingly, communication device 5 is capable of satisfying a higher required performance for 256-QAM, in the same manner as radio-frequency circuit 1.

Furthermore, the method of designing radio-frequency circuit 1 according to this embodiment is a method of designing radio-frequency circuit 1 that conveys a radio-frequency signal that is of a predetermined frequency band and is modulated using a predetermined modulation method. The radio-frequency circuit designing method includes: obtaining a condition of a magnitude slope for satisfying a required performance for the predetermined modulation method, the magnitude slope being the ratio of (i) the change in a magnitude ratio between an input signal and an output signal to (ii) the change in the frequency of the input signal; and designing the radio-frequency circuit to satisfy the condition of the magnitude slope obtained.

Accordingly, by satisfying the magnitude slope condition, radio-frequency circuit 1 satisfying the required performance for the modulation method can be designed, and a radio-frequency circuit satisfying a higher required performance for a high-order modulation method can also be designed.

For example, in the method of designing radio-frequency 1 according to this embodiment, the obtaining of the condition of the magnitude slope may include: obtaining the frequency-magnitude characteristic of a predetermined radio-frequency circuit and the EVM of a radio-frequency signal output from the predetermined radio-frequency circuit; deriving the magnitude slope using the frequency-magnitude characteristic obtained; and determining, as the condition of the magnitude slope, a range of the magnitude slope with which a required EVM for the predetermined modulation method is satisfied, based on the relationship between the derived magnitude slope and the obtained EVM.

Accordingly, a magnitude slope condition for the required EVM of the predetermined modulation method can be determined based on the frequency-magnitude characteristics of the predetermined radio-frequency circuit and the EVM of a radio-frequency signal output from the predetermined radio-frequency circuit. Therefore, the magnitude slope condition can be flexibly determined based on the modulation method and the required EVM.

For example, in the method of designing radio-frequency 1 according to this embodiment, the deriving of the magnitude slope may include deriving the magnitude slope using an approximation straight line indicating a correlation between the frequency of the input signal and the magnitude ratio between the input signal and the output signal, in the obtained frequency-magnitude characteristic.

Accordingly, the magnitude slope can be derived based on the approximation straight line, and thus the magnitude slope can be easily derived according to the tendency and property of a plurality of data points within the predetermined frequency band.

Implemental Example 1

The radio-frequency circuit designing method according to the foregoing embodiment works more effectively when the gap between adjacent frequency bands among the plurality of frequency bands used in communication is narrow. This is because, when the gap between adjacent frequency bands is narrow, it is difficult for a radio-frequency circuit to satisfy the required EVM. Typically, when the gap between adjacent frequency bands is narrow, in order to ensure isolation, an attenuation pole is located near a passband end of an acoustic wave filter, and thus phase change increases at the passband end of the acoustic wave filter. Furthermore, in order to ensure the attenuation steepness and attenuation amount of the acoustic wave filter, the number (number of stages) of resonators included in the acoustic wave filter becomes large, and loss and ripple in the passband becomes big. As a result, it becomes difficult for the radio-frequency circuit to satisfy the required EVM.

In view of this, radio-frequency circuit 1A according to Implemental Example 1 for which the designing method according to the foregoing embodiment works more effectively will be described with reference to FIG. 9.

2.1 Configuration of Radio-Frequency Circuit 1A

Figure 9:
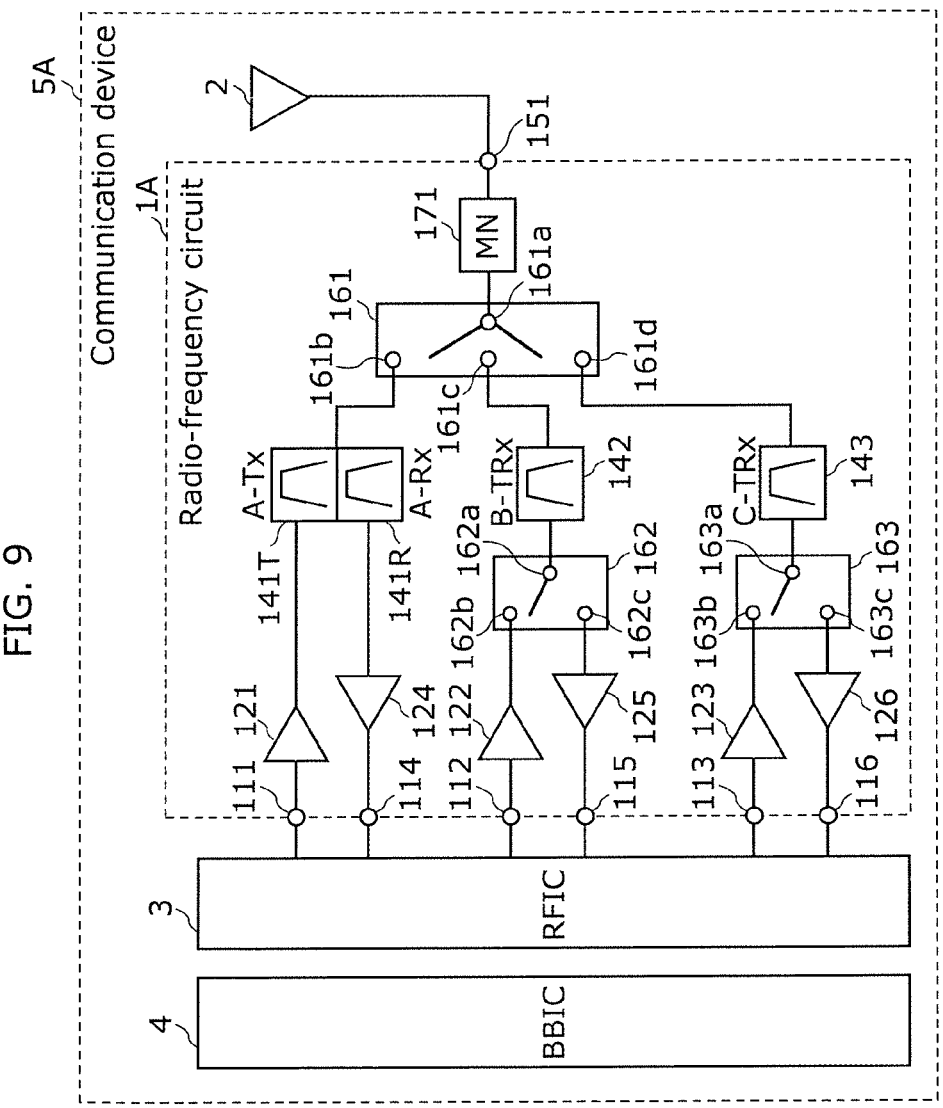
FIG. 9 is an example of circuit configuration diagram of a radio-frequency circuit and a communication device according to Implemental Example 1.

FIG. 9 is an example of a circuit configuration diagram of radio-frequency circuit 1A and communication device 5A according to Implemental Example 1.

Communication device 5A includes radio-frequency circuit 1A, antenna element 2, RFIC 3, and BBIC 4.

Radio-frequency circuit 1A conveys, between antenna element 2 and RFIC 3, radio-frequency signals of a predetermined frequency band which have been modulated using a predetermined modulation method. In FIG. 9, radio-frequency circuit 1A is a transceiver circuit that transmits and receives radio-frequency signals of a predetermined frequency band which have been modulated using 256-QAM, for example.

Radio-frequency circuit 1A includes radio-frequency input terminals 111 to 113, radio-frequency output terminals 114 to 116, power amplifiers 121 to 123, low-noise amplifiers 124 to 126, duplexer 141, transceiver filters 142 and 143, antenna connection terminal 151, switches 161 to 163, and matching circuit 171.

Radio-frequency input terminals 111 to 113 are terminals for receiving radio-frequency signals from outside radio-frequency circuit 1A. Radio-frequency input terminals 111 to 113 are connected to the inputs of power amplifiers 121 to 123, respectively.

Radio-frequency output terminals 114 to 116 are terminals for providing radio-frequency signals to the outside of radio-frequency circuit 1A. Radio-frequency output terminals 114 to 116 are connected to the outputs of low-noise amplifiers 124 to 126, respectively.

Power amplifier 121 is capable of amplifying the transmission signal of communication band A received via radio-frequency terminal 111.

Power amplifier 122 is capable of amplifying the transmission signal of communication band B received via radio-frequency terminal 112.

Power amplifier 123 is capable of amplifying the transmission signal of communication band C received via radio-frequency terminal 113.

Communication band refers to a frequency band that is defined in advance by a standards organization, and so on (for example, 3rd Generation Partnership Project (3GPP), Institute of Electrical and Electronics Engineers (IEEE), and so on), for a communication system constructed using radio access technology (RAT).

Communication band A is an example of a first communication band to which frequency division duplex (FDD) is applied. Communication band B is an example of a second communication band to which time division duplex (TDD) is applied. Communication band C is an example of a third communication band to which time division duplex is applied. Specific examples of communication bands will be described later using FIG. 10.

Low-noise amplifier 124 is capable of amplifying radio-frequency signals of communication band A received from antenna element 2 via antenna connection terminal 151.

Low-noise amplifier 125 is capable of amplifying radio-frequency signals of communication band B received from antenna element 2 via antenna connection terminal 151.

Low-noise amplifier 126 is capable of amplifying radio-frequency signals of communication band C received from antenna element 2 via antenna connection terminal 151.

The configuration of power amplifiers 121 to 123 and low-noise amplifiers 124 to 126 is not particularly limited, and they may be multi-stage amplifiers, or amplifiers that convert radio-frequency signals into differential signals and amplify the differential signals, for example.

Duplexer 141 passes radio-frequency signals of communication band A. Duplexer 141 transfers transmission signals and reception signals of communication band A by the FDD method. Duplexer 141 includes transmission filter 141T and reception filter 141R.

Transmission filter 141T (A-Tx) is an example of a first filter and is connected between power amplifier 121 and antenna connection terminal 151. Transmission filter 141T has a passband that includes the uplink operating band of communication band A. In other words, the passband of transmission filter 141T corresponds to the uplink operating band of communication band A. Therefore, transmission filter 141T is capable of passing signals of the transmission band of communication band A, among the radio-frequency signals amplified by power amplifier 121.

Reception filter 141R (A-Rx) is an example of a second filter and is connected between low-noise amplifier 124 and antenna connection terminal 151. Reception filter 141R has a passband that includes the downlink operating band of communication band A. Stated differently, the passband of reception filter 141R corresponds to the downlink operating band of communication band A. Therefore, reception filter 141R is capable of passing signals of the reception band of communication band A, among the radio-frequency signals input from antenna connection terminal 151.

Transceiver filter 142 (B-TRx) is an example of a first filter and is connected between (i) power amplifier 122 and low-noise amplifier 125 and (ii) antenna connection terminal 151. Transceiver filter 142 has a passband that includes communication band B. In other words, the passband of transceiver filter 142 corresponds to communication band B. Therefore, transceiver 142 is capable of passing transmission signals and reception signals of communication band B.

Transceiver filter 143 (C-TRx) is an example of a second filter and is connected between (i) power amplifier 123 and low-noise amplifier 126 and (ii) antenna connection terminal 151. Transceiver filter 143 has a passband that includes communication band C. In other words, the passband of transceiver filter 143 corresponds to communication band C. Therefore, transceiver 143 is capable of passing transmission signals and reception signals of communication band C.

Duplexer 141 and transceiver filters 142 and 143 may each be any one of a surface acoustic filter, an acoustic wave filter using BAW, a FBAR filter, an LC resonant filter, and a dielectric filter, but is not limited to these.

Switch 161 is connected between (i) antenna connection terminal 151 and (ii) duplexer 141, transceiver filter 142, and transceiver filter 143. Specifically, switch 161 includes terminals 161a to 161d. Terminal 161a is connected to antenna connection terminal 151 via matching circuit 171. Terminal 161b is connected to duplexer 141. Terminals 161c and 161d are connected to transceiver filters 142 and 143, respectively. In a connection configuration such as that described above, switch 161 is capable of connecting at least one of terminals 161b to 161d to terminal 161a, based on a control signal from RFIC 3, for example. In other words, switch 161 is capable of switching between connecting and disconnecting antenna element 2 and duplexer 141, switching between connecting and disconnecting antenna element 2 and transceiver filter 142, and switching between connecting and disconnecting antenna element 2 and transceiver filter 143. Switch 161 is configured of, for example, a multi-connection switch circuit, and is called an antenna switch in some cases.

Switch 162 is connected between (i) transceiver filter 142 and (ii) power amplifier 122 and low-noise amplifier 125. Specifically, switch 162 includes terminals 162a to 162c. Terminal 162a is connected to transceiver filter 142. Terminals 162b and 162c are connected to power amplifier 122 and low-noise amplifier 125, respectively. In a connection configuration such as that described above, switch 162 is capable of connecting either terminal 162b or 162c to terminal 162a, based on a control signal from RFIC 3, for example. In other words, switch 162 is capable of switching between connecting transceiver filter 142 and power amplifier 122 and connecting transceiver filter 142 and low-noise amplifier 125. Switch 162 is configured of, for example, a single pole, double throw (SPDT) switch circuit, and is called a TDD switch in some cases.

Switch 163 is connected between (i) transceiver filter 143 and (ii) power amplifier 123 and low-noise amplifier 126. Specifically, switch 163 includes terminals 163a to 163c. Terminal 163a is connected to transceiver filter 143. Terminals 163b and 163c are connected to power amplifier 123 and low-noise amplifier 126, respectively. In a connection configuration such as that described above, switch 163 is capable of connecting either terminal 163b or 163c to terminal 163a, based on a control signal from RFIC 3, for example. In other words, switch 163 is capable of switching between connecting transceiver filter 143 and power amplifier 123 and connecting transceiver filter 143 and low-noise amplifier 126. Switch 163 is configured of, for example, an SPDT switch circuit, and is called a TDD switch in some cases.

Matching circuit 171 is connected between antenna connection terminal 151 and switch 161. Matching circuit 171 performs impedances matching between (i) antenna element 2 and (ii) duplexer 141, and transceiver filters 142 and 143.

2.2 Communication Band Combinations

Specific examples of combinations of adjacent first and second frequency bands for which the designing method according to the foregoing embodiment functions effectively in radio-frequency circuit 1A according to this implemental example, will be described with reference to FIG. 10. FIG. 10 is a list of combinations of first frequency bands and second frequency bands in Implemental Example 1.

Combinations of uplink operating bands and downlink operating bands of communication band A to which FDD is applied can be given as a first example of combinations of a first frequency band and a second frequency band. More specifically, as indicated in FIG. 10, the first example of combinations of the first frequency band and the second frequency band includes the combinations of respective uplink operating bands and downlink operating bands of 5th Generation New Radio (5G-NR) bands n71, n28, n20, n26, n8, n3, n2, and n25.

In such a first example of combinations, the gap (frequency gap (X)) between the first frequency band and the second frequency band is at most 20 megahertz. Furthermore, the ratio (X/Y) of the gap (X) between the first frequency band and the second frequency band to the center frequency (Y) of the first frequency band is at most 2 percent. In addition, the ratio (X/Z) of the gap (X) between the first frequency band and the second frequency band to the bandwidth (bandwidth (Z)) of the first frequency band is at most 40 percent.

Furthermore, combinations of communication band B to which TDD is applied and communication band A to which FDD is applied can be given as a second example of combinations of a first frequency band and a second frequency band. More specifically, as indicated in FIG. 10, the second example of combinations of the first frequency band and the second frequency band includes the combination of 5G-NR band n39 and the downlink operating band of 5G-NR band n25.

In such a second example of a combination, the gap between the first frequency band and the second frequency band is also at most 20 megahertz. Furthermore, the ratio of the gap between the first frequency band and the second frequency band to the center frequency of the first frequency band is at most 2 percent. In addition, the ratio of the gap between the first frequency band and the second frequency band to the bandwidth of the first frequency band is at most 40 percent.

Furthermore, combinations of communication band B to which TDD is applied and communication band C to which TDD is applied can be given as a third example of combinations of a first frequency band and a second frequency band. More specifically, as indicated in FIG. 10, the third example of combinations of the first frequency band and the second frequency band includes the combination of 5G-NR bands n77 and n79, the combination of 5G-NR band n79 and a wireless local area network (WLAN) band of at least 5 gigahertz, and combinations of WLAN bands of at least 5 gigahertz.

In such a third example of combinations, since the frequencies of the first frequency band and the second frequency band are high, the gap between the first frequency band and the second frequency band is greater than 20 megahertz, and there are cases where the ratio of the gap between the first frequency band and the second frequency band to the center frequency of the first frequency band or the second frequency band is greater than 2 percent. However, as with the above-described combinations, the ratio of the gap between the first frequency band and the second frequency band to the bandwidth of the first frequency band or the second frequency band is at most 40 percent.

It should be noted that in the third example of combinations of the first frequency band and the second frequency band may include a combination of 5G-NR bands of at least 5 gigahertz, a combination of a 5G-NR band of at least 5 gigahertz and a WLAN band of at least 5 gigahertz, and a combination of a WLAN band of at least 5 gigahertz and a 5G-NR band of at least 5 gigahertz. There are cases where a 5G-NR band of at least 5 gigahertz is called a NR-U band.

As described above, radio-frequency circuit 1A according to this implemental example may include: transmission filter 141T having a passband including a first frequency band; and reception filter 141R having a passband including a second frequency band different from the first frequency band. The first frequency band may be an uplink operating band of communication band A to which frequency division duplex is applied, and the second frequency band may be a downlink operating band of communication band A. Here, the gap between the first frequency band and the second frequency band may be at most 20 megahertz. Furthermore, the ratio of (i) the gap between the first frequency band and the second frequency band to (ii) the center frequency of the first frequency band or the second frequency band may be at most 2 percent. Furthermore, the ratio of (i) the gap between the first frequency band and the second frequency band to (ii) the bandwidth of the first frequency band or the second frequency band may be at most 40 percent.

Furthermore, for example, radio-frequency circuit 1A according to this implemental example may include: transceiver filter 142 having a passband including a first frequency band; and duplexer 141 having a passband including a second frequency band different from the first frequency band. The first frequency band may be communication band B to which time division duplex is applied, and the second frequency band may be an uplink operating band or a downlink operating band of communication band A to which frequency division duplex is applied. Here, the gap between the first frequency band and the second frequency band may be at most 20 megahertz. Furthermore, the ratio of (i) the gap between the first frequency band and the second frequency band to (ii) the center frequency of the first frequency band or the second frequency band may be at most 2 percent. Furthermore, the ratio of (i) the gap between the first frequency band and the second frequency band to (ii) the bandwidth of the first frequency band or the second frequency band may be at most 40 percent.

Furthermore, for example, radio-frequency circuit 1A according to this implemental example may include: transceiver filter 142 having a passband including a first frequency band; and transceiver filter 143 having a passband including a second frequency band different from the first frequency band. The first frequency band may be communication band B to which time division duplex is applied, and the second frequency band may be communication band C to which the time division duplex is applied. Here, the ratio of (i) the gap between the first frequency band and the second frequency band to (ii) the bandwidth of the first frequency band or the second frequency band may be at most 40 percent.

In this manner, by applying the designing method according to the foregoing embodiment to radio-frequency circuit 1A which is capable of communication in the first frequency band and the second frequency band which have a narrow gap, radio-frequency circuit 1A can easily satisfy a higher required performance.

It should be noted that this implemental example is only an exemplification of a combination of frequency bands that enable the designing method according to the foregoing embodiment to work more effectively. Therefore, application of the designing method according to the foregoing embodiment to other combinations of frequency bands is not to be excluded. In other words, the designing method according to the foregoing embodiment can be applied to any combination of frequency bands.

Implemental Example 2

Next, Implemental Example 2 will be described. This implemental example is different from Implemental Example 1 in that matching circuit 171 included in radio-frequency circuit 1A is a variable-impedance matching circuit. Implemental example 2 will be described below with reference to the drawings and focusing on the points of difference from Implemental Example 1.

It should be noted that the circuit configuration of communication device 5A and radio-frequency circuit 1A according to this implemental example is the same as in Implemental Example 1, and thus illustration and description thereof is omitted.

3.1 Circuit Configuration of Matching Circuit 171

Figure 11A:
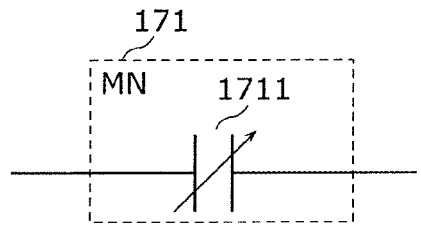
FIG. 11A is a diagram illustrating an example of a circuit configuration of a matching circuit in Implemental Example 2.
Figure 11B:
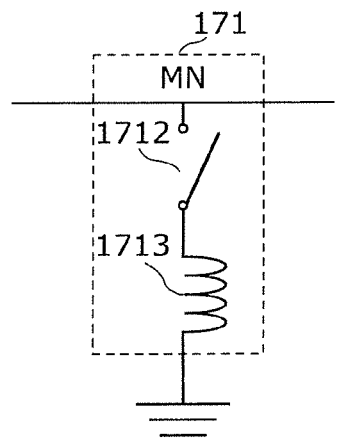
FIG. 11B is a diagram illustrating an example of a circuit configuration of the matching circuit in Implemental Example 2.
Figure 11C:
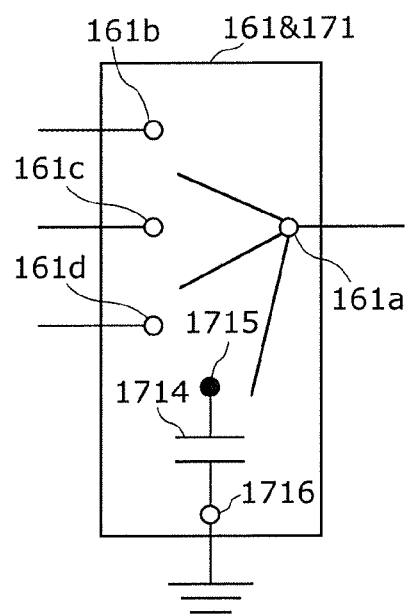
FIG. 11C is a diagram illustrating an example of a circuit configuration of the matching circuit and a switch in Implemental Example 2.

Specific circuit configurations of matching circuit 171 according to this implemental example will be described with respect to FIG. 11A to FIG. 11C. FIG. 11A and FIG. 11B are diagrams illustrating exemplary circuit configurations of matching circuit 171 in Implemental Example 2. FIG. 11C is a diagram illustrating an example of a circuit configuration of matching circuit 171 and switch 161 in Implemental Example 2.

In the example in FIG. 11A, matching circuit 171 includes variable capacitor 1711 connected between antenna connection terminal 151 and switch 161. Variable capacitor 1711 changes impedance according to the connection state of switch 161. For example, when terminal 161a is connected to any one of terminals 161b to 161d in switch 161, the impedance of variable capacitor 1711 is set to a first impedance. Furthermore, when terminal 161a is connected to another one of terminals 161b to 161d in switch 161, the impedance of variable capacitor 1711 is set to a second impedance different from the first impedance. Accordingly, matching circuit 171 is capable of changing impedance according to the communication band to be used in communication.

In the example in FIG. 11B, matching circuit 171 includes switch 1712 and inductor 1713 which are connected between (i) a path connecting antenna connection terminal 151 and switch 161 and (ii) a ground. Switch 1712 switches between connecting and disconnecting the path connecting antenna connection terminal 151 and switch 161 and inductor 1713. For example, switch 1712 switches ON or OFF based on a control signal from RFIC 3. Accordingly, switching ON and OFF of switch 1712 according to whether terminal 161a is connected to any one of terminals 161b to 161d in switch 161 or terminal 161a is connected to another one of terminals 161b to 161d is achieved. Accordingly, matching circuit 171 is capable of changing impedance according to the communication band to be used in communication. It should be noted that in the example in FIG. 11B, inductor 1713 may be replaced with a capacitor.

In the example in FIG. 11C, matching circuit 171 is incorporated into switch 161. Switch 161 and matching circuit 171 are mounted on a single semiconductor circuit, for example. Switch 161 and matching circuit 171 include terminals 161a to 161c, capacitor 1714, internal node 1715, and terminal 1716.

Internal node 1715 is connected to capacitor 1714. Capacitor 1714 is connected to a ground via terminal 1716. In a connection configuration such as that described above, switch 161 is capable of connecting at least one of terminals 161b to 161d to terminal 161a and connecting internal node 1715 to terminal 161a, based on a control signal from RFIC 3, for example. For example, switch 161 is capable of switching between connecting and disconnecting terminal 161a and internal node 1715 depending on when depending on when terminal 161a is connected to any one of terminals 161b to 161d or when terminal 161a is connected to another one of terminals 161b to 161d. Accordingly, matching circuit 171 is capable of changing impedance according to the communication band to be used in communication.

It should be noted that matching circuit 171 may be connected in a path between each filter and switch 161.

As described above, radio-frequency circuit 1A according to this implemental example includes variable impedance matching circuit 171 connected in a path connecting (i) duplexer 141 and transceiver filters 142 and 143 and (ii) antenna connection terminal 151.

Accordingly, the impedance of matching circuit 171 can be adjusted according to the communication band to be used in communication, and thus loss due to impedance mismatch can be reduced. At this time, since the loss reducing effect is greater with a frequency where greater loss occurs, ripple can be reduced as a result.

Implemental Example 3

Next, Implemental Example 3 will be described. In this implemental example, a filter for keeping the magnitude slope to at least −0.1 dB/MHz and at most 0.1 dB/MHz in radio-frequency circuit 1A according to Implemental Example 1 will be described.

As previously described, when the gap between adjacent frequency bands is narrow, in order to ensure isolation, an attenuation pole is located near a passband end of an acoustic wave filter, and thus phase change increases at the passband end of the acoustic wave filter. Furthermore, in order to ensure the attenuation steepness and attenuation amount of the acoustic wave filter, the number (number of stages) of resonators included in the acoustic wave filter becomes large, and loss and ripple in the passband becomes big.

In view of this, in this implemental example, a bulk acoustic wave filter is used in at least one of duplexer 141 and transceiver filters 142 and 143. Here, the bulk acoustic wave filter includes a film bulk acoustic resonator (FBAR) filter. The bulk acoustic wave filter has a higher Q value than a surface acoustic wave filter, and thus the number (number of stages) of resonators can be reduced, and ripple can be reduced.

Furthermore, when communication band B or C is (i) a communication band of at least 3 gigahertz, which is for a mobile communication system, and to which time division duplex is applied or (ii) a communication band of at least 5 gigahertz which for a wireless local area network system, an LC filter may be used for transceiver filter 142 and/or transceiver filter 143. Accordingly, an LC filter is used for a comparatively high frequency band, and thereby ripple can be reduced.

By adopting such a filter, the magnitude slope of radio-frequency circuit 1A is set to at least −0.1 dB/MHz and at most 0.1 dB/MHz, which facilitates the satisfaction of the required EVM.

Furthermore, ripple can also be reduced by breaking up a single steep ripple into a plurality of ripples that are less steep than the single ripple. Here, the breaking up of a single steep ripple into a plurality ripples that are less steep will be specifically described with reference to FIG. 12.

Figure 12:
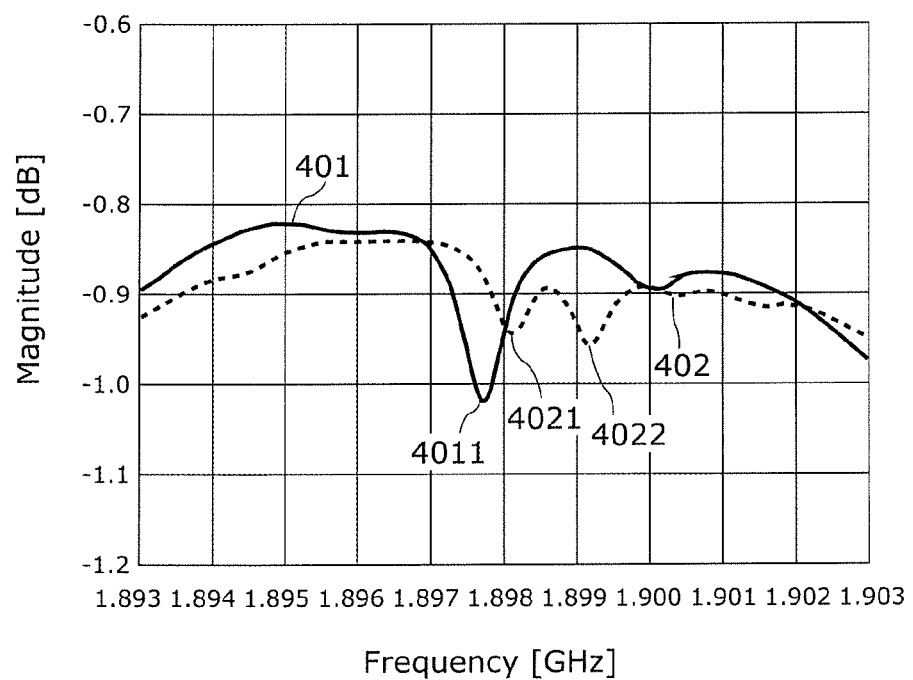
FIG. 12 is a graph illustrating frequency characteristics of a filter in Implemental Example 3.

FIG. 12 is a line graph illustrating frequency characteristics of a filter in Implemental Example 3. In FIG. 12, the vertical axis denotes magnitude, and the horizontal axis denotes frequency.

Data line 401 represents acoustic wave filter frequency characteristics which include, inside the passband, a single steep ripple 4011. The absolute value of the slope of ripple 4011 is at most 0.1 dB/MHz.

Data line 402 represents acoustic wave filter frequency characteristics which include, inside the passband, two ripples 4021 and 4022 which are less steep than ripple 4011. The absolute value of the slope of each of ripples 4021 and 4022 is at least 0.05 dB/MHz and at most 0.1 dB/MHz. Furthermore, the difference of the peak frequencies of the two ripples 4021 and 4022 is at most 2 MHz. In this manner, breaking up the single steep ripple 4011 into ripples 4021 and 4022 which less steep than ripple 4011 can be realized, for example, by staggering the resonance frequencies of the serial arm resonators included in the acoustic wave filter or by staggering the antiresonance frequencies of the parallel arm resonators.

Other Embodiments

Although the radio-frequency circuit, communication device, and radio-frequency circuit designing method according to present disclosure have been described based on an exemplary embodiment and implemental examples, the radio-frequency circuit, communication device, and radio-frequency circuit designing method according to present disclosure are not limited to the foregoing embodiment and implemental examples. The present disclosure also encompasses variations resulting from various modifications to the foregoing embodiment and implemental examples that may be conceived by those skilled in the art without departing from the essence of the present disclosure, forms achieved by combining arbitrary elements in the foregoing embodiment and implemental examples, and various devices that include the radio-frequency circuit and the communication device according to the present disclosure.

Furthermore, although radio-frequency signals modulated mainly by 256-QAM are described in the foregoing embodiment and the respective implemental examples, the modulation method to which the present disclosure can be applied is not limited to 256-QAM. For example, the present disclosure may be applied to even higher-order modulation methods (for example, 1024-QAM, and so on).

Furthermore, for example, in the radio-frequency circuit and communication device according to the foregoing embodiment and the respective implemental examples, another radio-frequency circuit element, wiring, and so on, may be inserted in a path connecting respective circuit elements and signal paths which are disclosed in the drawings Furthermore, the radio-frequency circuit and the communication device support 5G-NR and/or WLAN in the foregoing embodiment and the respective implemental examples, but may support other wireless access technology in addition to or in place of these wireless access technologies. For example, the radio-frequency circuit and communication device may support 4th Generation Long Term Evolution (4G-LTE)-Advanced. Furthermore, the radio-frequency circuit and the communication device may support E-UTRA New Radio Dual Connectivity (EN-DC) in which a 5G-NR communication band and a 4G-LTE communication band are combined and simultaneously communication thereof is performed. Furthermore, the radio-frequency circuit and the communication device may support communication in a millimeter-wave frequency band of at least 7 gigahertz. In this case, a distributed constant type filter, for example, may be used as a filter.

INDUSTRIAL APPLICABILITY

The present disclosure may be widely used in communication apparatuses such as a mobile phone, as a front-end module capable of transmitting and/or receiving radio-frequency signals modulated using a high-order modulation method.

The invention claimed is:

1. A radio-frequency circuit configured to convey a radio-frequency signal that is of a predetermined frequency band and is modulated using 256-Quadrature Amplitude Modulation (QAM), comprising:
   a first filter having a passband including a first frequency band; and
   a second filter having a passband including a second frequency band different from the first frequency band, wherein:
      the first frequency band is an uplink operating band of a first communication band to which frequency division duplex is applied,
      the second frequency band is a downlink operating band of the first communication band, and
      a ratio of (i) a gap between the first frequency band and the second frequency band to (ii) a center frequency of one of the first frequency band and the second frequency band is at most 2 percent,
   wherein:
      a magnitude slope is at least −0.1 dB/MHz and at most 0.1 dB/MHz in the predetermined frequency band, the magnitude slope being a ratio of (i) a change in a magnitude ratio between an input signal and an output signal to (ii) a change in a frequency of the input signal.

2. The radio-frequency circuit according to claim 1, comprising:
   a transmission circuit configured to transmit the radio-frequency signal.

3. The radio-frequency circuit according to claim 1, wherein
   a gap between the first frequency band and the second frequency band is at most 20 megahertz.

4. The radio-frequency circuit according to claim 1, further comprising:

a matching circuit connected in a path connecting (i) the first filter and the second filter and (ii) an antenna connection terminal, the matching circuit having a variable impedance.

5. The radio-frequency circuit according to claim 1, comprising:
a bulk acoustic wave filter.

6. The radio-frequency circuit according to claim 1, comprising:
an inductive-capacitive (LC) filter having a passband including one of (i) a communication band of at least 3 gigahertz, which is for a mobile communication system, and to which time division duplex is applied, and (ii) a communication band of at least 5 gigahertz, which is for a wireless local area network system.

7. A radio-frequency circuit configured to convey a radio-frequency signal that is of a predetermined frequency band and is modulated using 256-Quadrature Amplitude Modulation (QAM), comprising:
a first filter having a passband including a first frequency band; and
a second filter having a passband including a second frequency band different from the first frequency band, wherein
the first frequency band is an uplink operating band of a first communication band to which frequency division duplex is applied,
the second frequency band is a downlink operating band of the first communication band, and
a ratio of (i) a gap between the first frequency band and the second frequency band to (ii) a bandwidth of one of the first frequency band and the second frequency band is at most 40 percent,
wherein:
a magnitude slope is at least −0.1 dB/MHz and at most 0.1 dB/MHz in the predetermined frequency band, the magnitude slope being a ratio of (i) a change in a magnitude ratio between an input signal and an output signal to (ii) a change in a frequency of the input signal.

8. A radio-frequency circuit configured to convey a radio-frequency signal that is of a predetermined frequency band and is modulated using 256-Quadrature Amplitude Modulation (QAM), comprising:
a first filter having a passband including a first frequency band; and
a second filter having a passband including a second frequency band different from the first frequency band, wherein
the first frequency band is a second communication band to which time division duplex is applied,
the second frequency band is one of an uplink operating band and a downlink operating band of a first communication band to which frequency division duplex is applied, and
a ratio of (i) a gap between the first frequency band and the second frequency band to (ii) a center frequency of one of the first frequency band and the second frequency band is at most 2 percent,
wherein:
a magnitude slope is at least −0.1 dB/MHz and at most 0.1 dB/MHz in the predetermined frequency band, the magnitude slope being a ratio of (i) a change in a magnitude ratio between an input signal and an output signal to (ii) a change in a frequency of the input signal.

9. The radio-frequency circuit according to claim 8, further comprising:
a matching circuit connected in a path connecting (i) the first filter and the second filter and (ii) an antenna connection terminal, the matching circuit having a variable impedance.

* * * * *